United States Patent
Galle et al.

(10) Patent No.: US 8,277,716 B2
(45) Date of Patent: Oct. 2, 2012

(54) APPARATUS, SYSTEM, AND METHOD OF MANUFACTURING A COMPOSITE TUBULAR USING A STIFFENED MANDREL

(75) Inventors: Gary L. Galle, Houston, TX (US); Karl A. Parfrey, Houston, TX (US)

(73) Assignee: Vetco Gray Inc., Houston, TX (US)

( * ) Notice: Subject to any disclaimer, the term of this patent is extended or adjusted under 35 U.S.C. 154(b) by 296 days.

(21) Appl. No.: 12/698,816

(22) Filed: Feb. 2, 2010

(65) Prior Publication Data

US 2010/0230856 A1  Sep. 16, 2010

Related U.S. Application Data

(60) Provisional application No. 61/160,161, filed on Mar. 13, 2009.

(51) Int. Cl.
*B29C 53/00* (2006.01)

(52) U.S. Cl. ........ 264/281; 425/383; 425/402; 425/403; 156/172; 156/446; 156/457

(58) Field of Classification Search .............. 425/383, 425/402, 403; 264/281; 156/172, 446, 457, 156/173, 175, 156
See application file for complete search history.

(56) References Cited

U.S. PATENT DOCUMENTS

| | | | |
|---|---|---|---|
| 2,641,301 A | 6/1953 | Gerber et al. | |
| 2,862,541 A | 12/1958 | Brink | |
| 4,010,054 A * | 3/1977 | Bradt | 156/173 |
| 5,071,506 A * | 12/1991 | Nelson et al. | 156/441 |
| 5,261,462 A | 11/1993 | Wolfe et al. | |
| 5,435,867 A | 7/1995 | Wolfe et al. | |
| 5,484,498 A | 1/1996 | Hogarth et al. | |

OTHER PUBLICATIONS

Filament Winding, Strong Than Steel, http://entec.com/filamenW.html.
What is Filament Winding? http://mccleananderson.com.

* cited by examiner

*Primary Examiner* — Joseph Del Sole
*Assistant Examiner* — David N Brown, II
(74) *Attorney, Agent, or Firm* — Bracewell & Giuliani LLP

(57) ABSTRACT

A stiffened mandrel used in the manufacture of a composite tubular. The mandrel is placed on a filament winding machine and is comprised of an outer and inner shell. A pressure source is connected to the mandrel to exert a tensile force on the outer shell to stiffen the mandrel and thereby prevent sagging and bending of the mandrel. The stiffened mandrel allows for the manufacture of a composite tubular without undesirable flexing, wrinkling, or contamination of the uncured composite.

17 Claims, 3 Drawing Sheets

APPARATUS, SYSTEM, AND METHOD OF MANUFACTURING A COMPOSITE TUBULAR USING A STIFFENED MANDREL

CROSS-REFERENCE TO RELATED APPLICATION

This application claims priority to provisional application 61/160,161 filed Mar. 13, 2009.

FIELD OF THE INVENTION

This invention relates in general to fabricating composite pipes using a filament winding process, and in particular, to preventing sag or bending of the mandrel used in filament winding by pressurizing a portion of the mandrel's interior.

BACKGROUND OF THE INVENTION

Composite materials are used to replace metal in many applications. For example, composite materials are used is in the fabrication of tubulars, such as pipes and pipelines used in oilfield exploration, drilling and production operations.

The construction of composite tubulars may take a variety of forms, depending upon the intended application of the tubular. Generally, composite tubulars comprise a plurality of layers of material, the selection of the layers being determined by the intended application. Wolfe et al. U.S. Pat. No. 5,261,462 and Wolfe et al. U.S. Pat. No. 5,435,867 disclose a tubular structure such as a pipe or a pressure vessel. Commonly, the composite pipes are prepared by winding the fibers impregnated with epoxy resin using a filament winding process around a mandrel. The filaments can be carbon fiber or other types of materials. As an alternative, if it is required to have a metallic liner present in the finished pipe, the filament winding process may be carried out around the liner itself. The epoxy is allowed to cure in order to complete the composite structure. The selection of the materials, the number, arrangement and thickness of the individual layers, together with the orientation of the fibers in the individual layers, are determined by the type of application.

During construction of composite tubulars, sagging and bending of the mandrel can result in unwanted flexing and wrinkling of the uncured composite. This is especially true when a long, slender mandrel is used to fabricate very long tubulars having small diameters.

Several different approaches have been taken to address the problems associated with sagging and bending of the filament winding mandrel. For example, special filament winding machines that apply tension and/or a bending moment to the ends of the mandrel have been used in an effort to prevent sagging in the mandrel. These special filament winding machines are expensive, requiring significant support structure and bearings. Another approach to avoid sagging or bending in the mandrel has been to inflate or pressurize the entire interior length of the mandrel. However, pressurizing the entire interior length of mandrel, which is typically metallic, is potentially dangerous to workers. This is because the significant volume presented by the mandrel's interior results in a large amount of stored energy in the pressurized mandrel, thereby increasing the destructive potential if the mandrel ruptures. Still another approach has been the use of rollers to support the mandrel during the filament winding process. Although the rollers may prevent sagging and bending, the rollers pinch and contaminate the uncured composite.

The fabrication of quality long, slender composite tubulars requires that mandrel sagging and bending be controlled. Current methods are expensive or do not prevent the unwanted wrinkling or contamination of the uncured resin. A need exists for a technique to control the sagging and bending in the filament winding mandrel in a cost-effective manner.

SUMMARY OF THE INVENTION

In an embodiment of the present invention, a mandrel comprising an outer cylindrical shell and a concentric inner cylindrical shell sealed against the inner surface of the outer cylindrical shell, can be used to manufacture a composite tubular. A chamber within the mandrel defined by the inner surface of the outer shell and sealed head of the inner cylindrical shell is connected to a pressure source via a test port that communicates with the chamber. The chamber is pressurized until a compressive force is exerted on the inner shell to stiffen and thereby prevent sagging and bending of the mandrel.

Once the mandrel is stiffened, it is mounted on a filament winding machine and filaments coated in resin are wound onto the mandrel and cured to form a composite tubular. The stiffened mandrel allows for the manufacture of a composite tubular without undesirable flexing, wrinkling, or contamination of the uncured composite.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
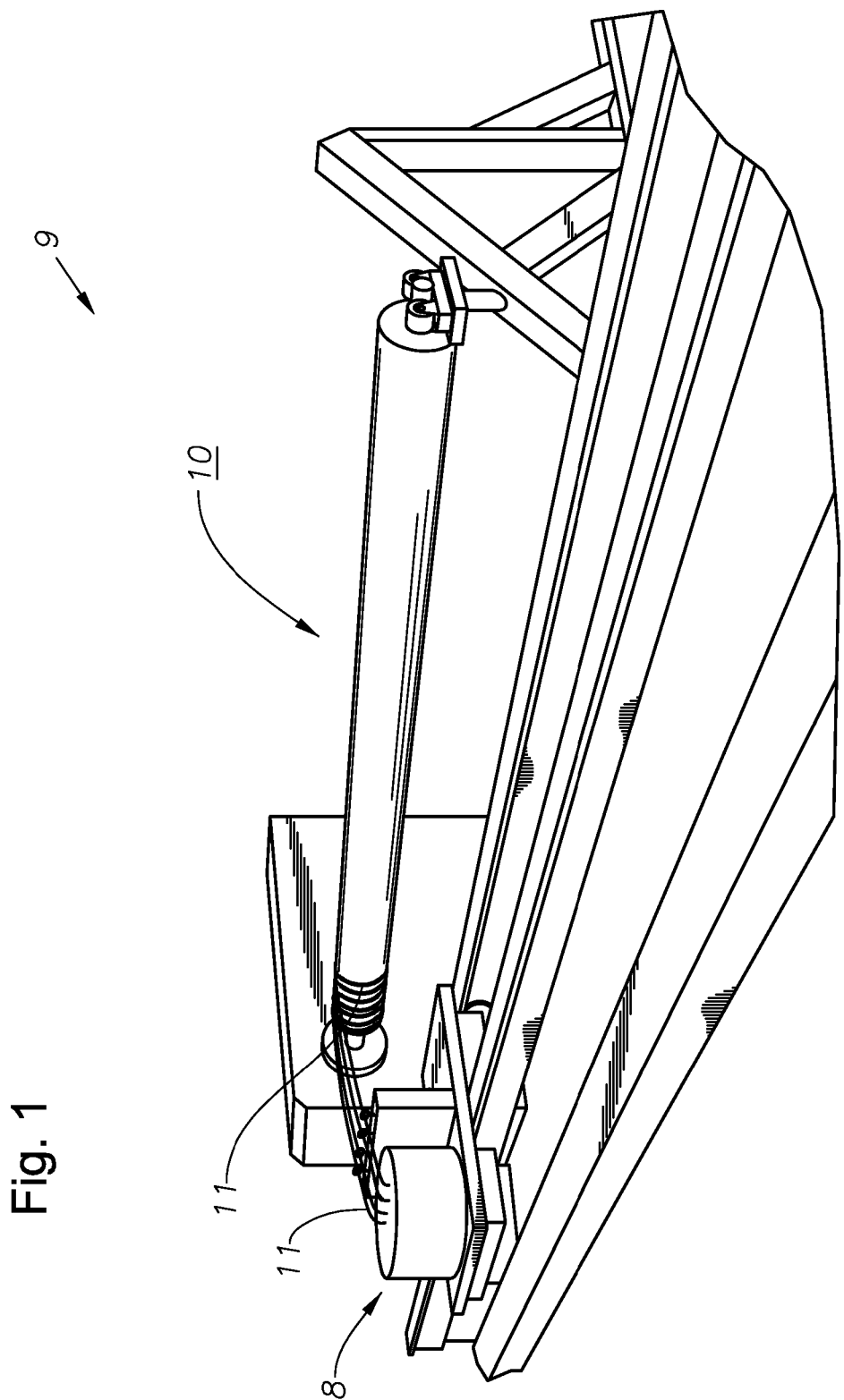
FIG. 1 illustrates a filament winding machine on which a mandrel is placed, in accordance with an exemplary embodiment of the present technique.

Referring generally to FIG. 1, a filament winding machine for producing composite tubulars is presented, and represented generally by reference numeral 9. The filament winding machine 9 is adapted to secure and rotate a mandrel 10 to enable composite filaments 11 to be wound on the mandrel 10 to produce a composite tubular. In the illustrated embodiment, the filament winding machine 9 comprises a hollow mandrel 10 that may be pressurized internally to increase the rigidity of the mandrel to control sagging during the filament winding process. Filaments 11 can be unwound from a creel system 8 and may be wound onto the mandrel 10 as a drive portion of the filament winding machine 9 rotates the mandrel 10. The creel system 8 may move back and forth along the axis of the mandrel 10.

Figure 2:
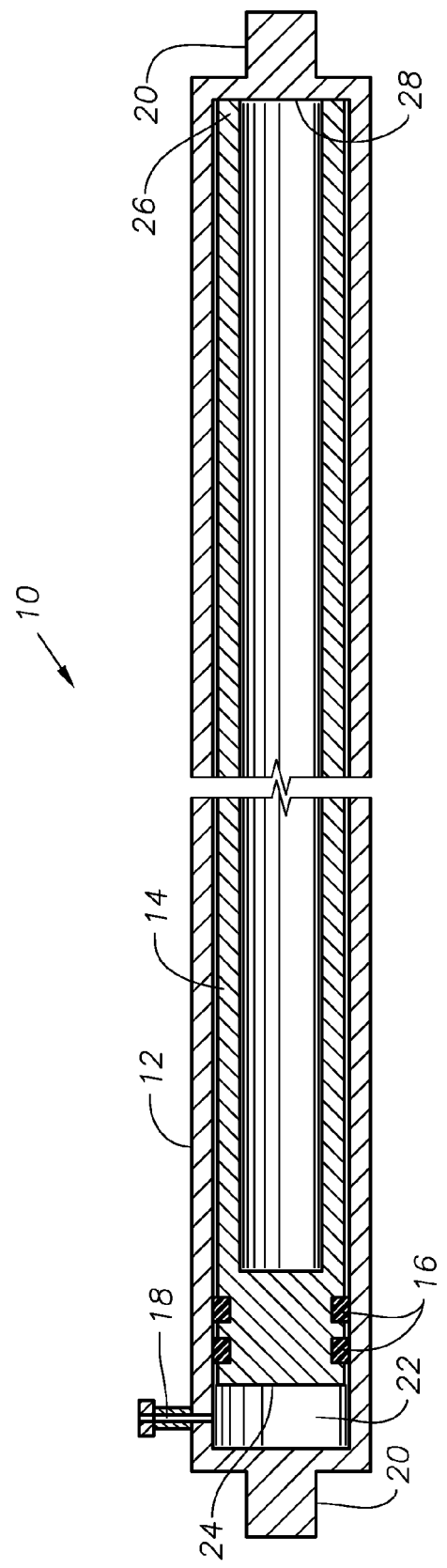
FIG. 2 illustrates a mandrel assembly in accordance with an exemplary embodiment of the present technique.

Referring generally to FIG. 2, an exemplary embodiment of the mandrel 10 assembly is illustrated. The illustrated embodiment of the mandrel 10 may be quite long. For example, the illustrated embodiment of the mandrel 10 may be seventy-five feet long or greater. However, the techniques described herein may be used with mandrels of shorter lengths, as well. In the illustrated embodiment, the mandrel 10 is comprises an outer shell 12 and an inner shell 14. Both shells, 12, 14, may be cylindrical in shape and preferably of steel construction. However, materials other than steel may be used. The inner shell 14 is concentrically located within the outer shell 12. The outer shell 12 has spindles 20 on both ends for securing it onto a filament winding machine, as shown in FIG. 1. The clearance between the outer wall of the inner shell 14 and the inner wall of the outer shell 12 is sufficient to allow the inner shell 14 to move axially relative to the outer shell 12. The outer shell 12 has a port 18 on one end that communicates through the outer shell's 12 wall into a chamber 22 defined by the outer shell's 12 interior and the head 24 of the inner shell 14. The head 24 of the inner shell 14 preferably has a pair of annular seals 16 to seal one end of the chamber 22 and, thereby, define the volume of the chamber 22. Annular seals 16 seal between the outer diameter of inner shell 14 and the inner diameter of outer shell 12. Head 24 of inner shell 14 is spaced inward from the head of outer shell 12. In addition, the end 26 of the inner shell 14 opposite head 24 is open and contacts the interior end 28 of the outer shell 12. The interior end 28 of the outer shell 12 is opposite the end with the pressure port 18. Head 24 serves as a piston to push abutting end 26 against interior end 28. Although inner shell 14 is shown to be tubular, it could be a solid rod having a cylindrical piston as head 24 and the length of inner shell 14 could be considered to be a shaft of the piston. The term "inner shell" as used herein means not only a hollow tubular member, but also a solid tubular member. In this embodiment, the only seals between the outer diameter of inner shell 14 and the inner diameter of outer shell 12 are seals 16 at head 24, thus only head 24 needs to be cylindrical and closely spaced to the inner diameter of outer shell 12. Moreover, if only a single chamber 22 is employed closed end 28 need not seal the interior of outer shell 12, although it is preferred that inner shell 14 be tubular and have a constant outer diameter.

As will be discussed in more detail below, the mandrel 10 is pressurized to increase the rigidity of the mandrel 10. However, rather than pressurizing the entire length of the interior of the mandrel 10, only the volume defined by the chamber 22 is pressurized. This is a much safer condition than having the entire interior length of a hollow mandrel pressurized. Chamber 22 has a length much shorter than the length of outer shell 12.

Figure 3:
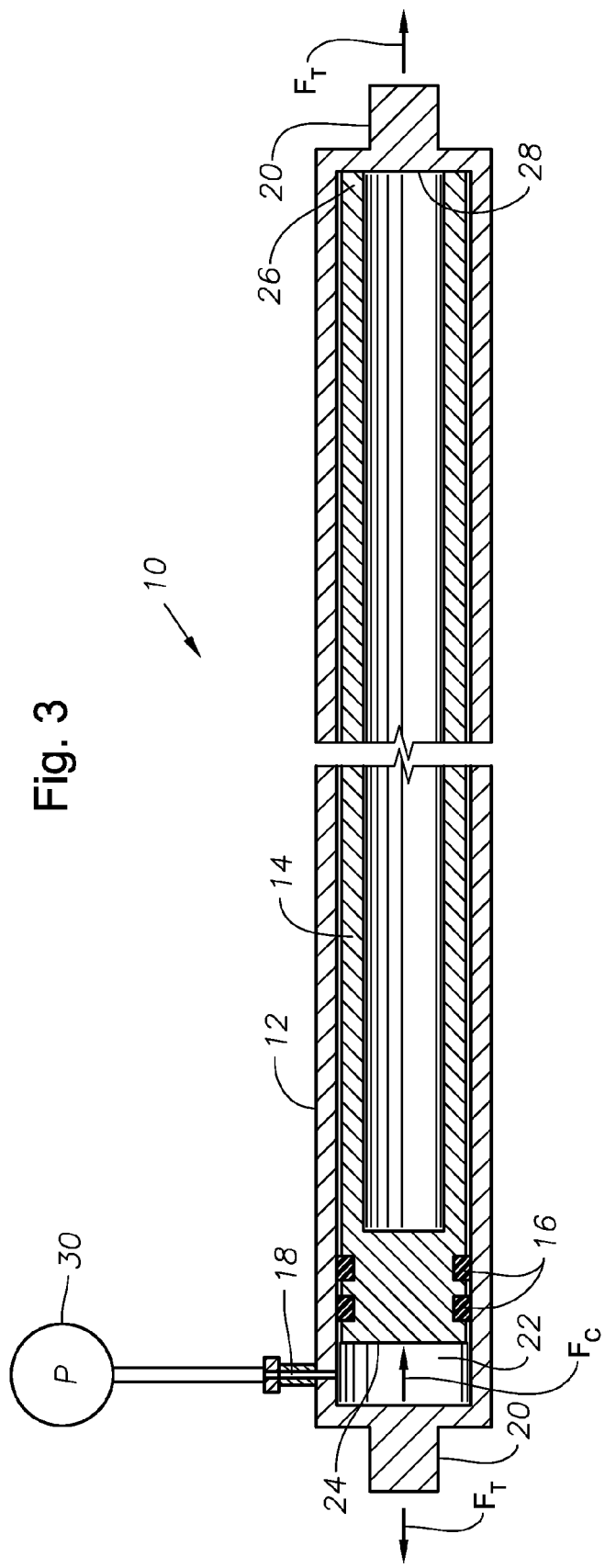
FIG. 3 illustrates the stiffening of the mandrel assembly through pressurization of the mandrel assembly in accordance with an exemplary embodiment of the present technique.

FIG. 3 illustrates the mandrel 10 stiffening process. This process is preferably performed before any resin and filament is wound onto the mandrel 10. A compressor or other pressure source 30 is attached to port 18 and operated to pressurize the chamber 22 created by the outer shell's 12 interior and the sealed head 24 of the inner shell 14. The chamber 22 can be pressurized hydraulically or with a gas, such as air. The chamber 22 is pressurized until the internal pressure in the chamber 22 induces axial compression (Fc) of the inner shell 14 and corresponding axial tension (Ft) in the outer shell 12, thereby stiffening the mandrel 10 sufficiently to control sagging or bending. The axial compression (Fc) on the inner shell 14 places a compressive pre-load on the inner shell 14, which opposes a resulting tensile pre-load (Ft) placed on the outer shell 12. The tensile pre-load on the outer shell 12 increases the effective stiffness of the mandrel 10, reducing sag and bending. Abutting end 26 of inner shell 14 abuts and exerts a force against interior end 28, which creates the compression in inner shell 14 and tension in outer shell 12. Once the chamber 22 is pressurized, the port 18 may then be sealed and the stiffened mandrel 10 can be placed on the filament winding machine 9, as shown in FIG. 1.

Filaments 11 coated with resin may be wound directly onto outer shell 12. Once the filament winding process has concluded and the resin has cured, the mandrel 10 is depressurized and extracted from the cured composite pipe by conventional means such as by a hydraulic ram. Although the preceding example relates to fabricating composite pipes for the oil drilling and production industry, the apparatus and process could also be used in other industries such as the converting, paper mill, and membrane industries.

In another embodiment (not shown), a screw rather than fluid pressure is utilized to axially compress the inner shell 14 and place corresponding axial tension on the outer shell 12. The screw would be located in chamber 22.

Another embodiment (not shown) would use pressure ports on both ends to axially compress the inner shell 14 and place corresponding axial tension on the outer shell 12. A second chamber 22 similar to chamber 22 would be located on the opposite end of the mandrel 10.

The system reduces the problems associated with fabricating long, slender, composite tubulars by stiffening the mandrel. The stiffened mandrel 10 controls sagging and bending and thus reduces wrinkling and flexing of the uncured composite material. Furthermore, the system controls these problems without pinching or contaminating the uncured composite material and without dangerous pressurization of the entire mandrel 10. The mandrel 10 assembly thus eliminates costly defects in composite tubular fabrication and the need for expensive, specialized machinery.

This written description uses examples to disclose the invention, including the best mode, and also to enable any person skilled in the art to practice the invention, including making and using any devices or systems and performing any incorporated methods. These embodiments are not intended to limit the scope of the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An apparatus for manufacturing a composite tubular, comprising:

a filament winding machine a mandrel around which a filament is adapted to be wound, the mandrel having a chamber within, the mandrel being mounted on the filament winding machine for being rotatably driven by the filament winding machine, the mandrel further comprising:

an outer cylindrical shell having a first end that is closed and a second end;

an inner cylinder having a piston portion adjacent the first end and a shaft portion extending from the piston portion into abutment with an internal shoulder adjacent to the second end of the outer cylindrical shell, the piston portion having a seal between its outer diameter and the outer cylindrical shell, defining the chamber between the piston portion and the first end of the outer cylindrical shell; and a port located on the mandrel and in communication with the chamber, the port being connectable to a pressure source to allow pressurization of the chamber in order to create a compressive force on the inner cylinder and thereby stiffen the mandrel.

2. The apparatus according to claim 1, wherein a spindle is formed at each of the ends of the outer cylindrical shell to allow mounting of the mandrel on the filament winding machine.

3. The apparatus according to claim 1, wherein the port is located adjacent to the first ends of the outer cylindrical shell.

4. The apparatus according to claim 1, wherein the piston portion is slidably carried within the outer cylindrical shell.

5. The apparatus according to claim 4, wherein the shaft portion extends from the piston portion for applying an axial tensile force to the second end of the outer cylindrical shell, the inner cylinder having a length much greater than a length of the chamber.

6. A composite tubular manufacturing system, comprising:
- a mandrel adapted to be mounted on and rotated by a filament winding machine for winding filament about the mandrel, the mandrel having an outer cylindrical shell and a concentric inner cylindrical shell located within, and axially moveable relative to the outer cylindrical shell;
- the outer cylindrical shell having first and second closed ends, the inner cylindrical shell having a head adjacent the first closed end and an abutting end in contact with the second closed end;
- a seal between an outer diameter of the inner cylindrical shell and an inner diameter of the outer cylindrical shell, defining chamber between the first closed end and the head; and
- a port located on the outer shell and connectable to a pressure source to allow pressurization of the chamber, the pressurization of the chamber applying a compressive force on the inner cylindrical shell which causes the abutting end to apply a tensile force to the second closed end, thereby stiffening the mandrel.

7. The system according to claim 6, wherein the seal is located nearer to the first closed end than the second closed end.

8. The system according to claim 6, wherein spindle is formed at each end of the outer cylindrical shell to allow mounting of the mandrel on the filament winding machine.

9. The system according to claim 6, wherein the port is located adjacent one end of the outer cylindrical shell.

10. The system according to claim 6, wherein a length of the chamber is much less than a length of the inner cylindrical shell.

11. The system according to claim 6, wherein the abutting end of the inner cylindrical shell is open.

12. A method of manufacturing composite tubulars, comprising:
- providing an outer cylindrical shell;
- assembling an inner member concentrically within the outer cylindrical shell and sealing an outer diameter of the inner member against an inner diameter of the outer cylindrical shell, defining at least one sealed chamber in the outer cylindrical shell;
- attaching a pressure source to a port located on the outer shell that communicates with the chamber;
- pressurizing the chamber in the mandrel with a fluid introduced by the pressure source, which induces axial compression of the inner member, wherein the inner member has an abutting end opposite the chamber that abuts an end portion of the outer shell to apply a tensile force to the outer shell when the chamber is pressurized and induces corresponding axial tension in the outer shell to thereby stiffen the mandrel to control sagging or bending of the mandrel;
- mounting the stiffened mandrel on a filament winding machine;
- winding a filament onto the outer shell of the mandrel and applying resin and curing the resin to form a composite tubular; and
- removing the cured composite pipe from the mandrel.

13. The method of claim 12, further comprising sealing the port after pressurization of the chamber is complete and before beginning to wind the filament.

14. The method of claim 12, wherein the step of removing the mandrel further comprises depressurizing the chamber.

15. The method of claim 12, wherein the inner member is free to move axially within the outer shell.

16. The method of claim 12, wherein sealing an outer diameter of the inner member to an inner diameter of the outer shell comprises placing a seal adjacent a closed end of the inner shell.

17. The method of claim 12, wherein the chamber has an axial length much shorter than the axial lengths of the inner member and the outer shell.

* * * * *